United States Patent Office 3,151,054
Patented Sept. 29, 1964

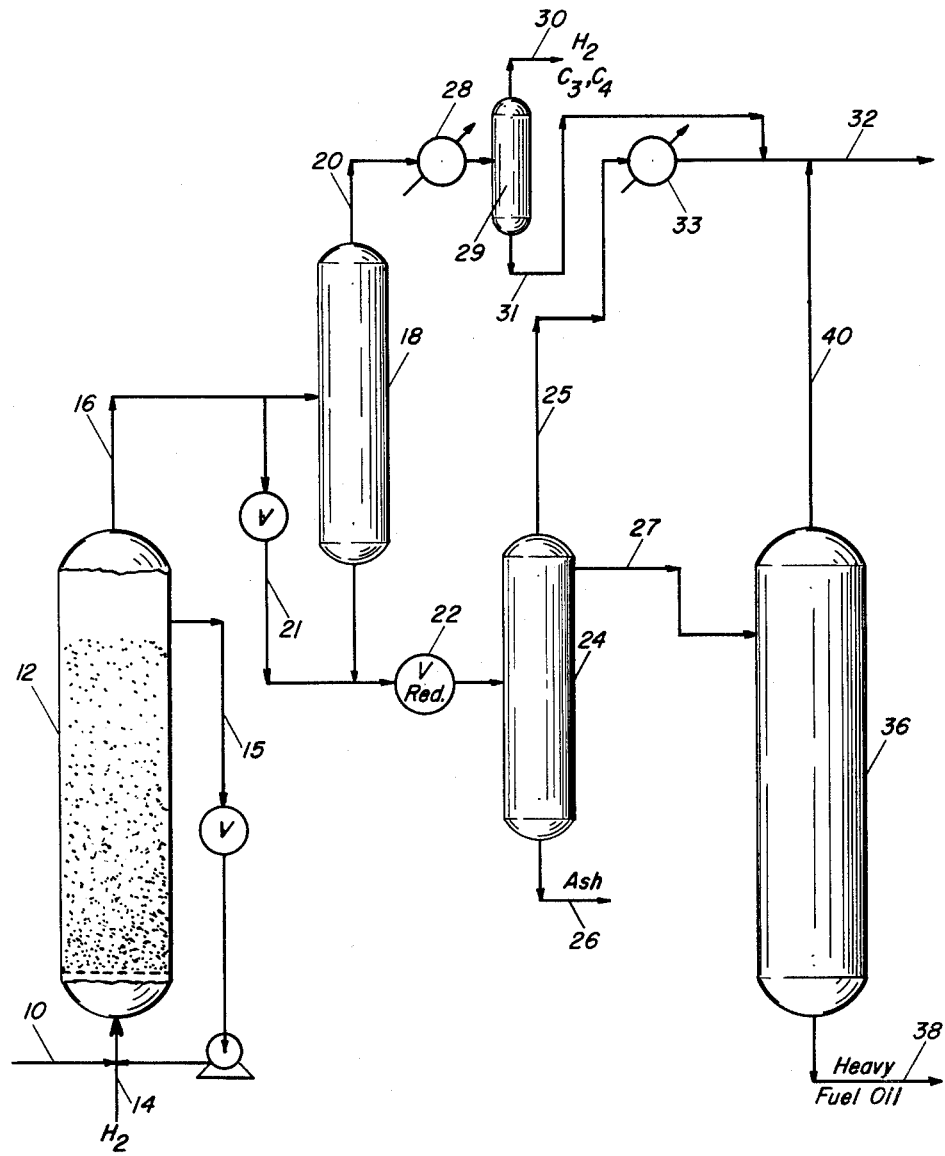

3,151,054
TREATING TAR SANDS
Edwin T. Layng, Summit, N.J., assignor to Hydrocarbon Research, Inc., New York, N.Y., a corporation of New Jersey
Filed July 6, 1961, Ser. No. 122,275
6 Claims. (Cl. 208—11)

This invention relates to an improved method for the economical conversion of naturally occurring tar sands such as Athabasca tar sands.

It is recognized that the vast size of the reserves of tar sands in the Lake Athabasca region could make available hydrocarbons at low cost except for the difficulty in removing the inorganic solids. These are usually in such finely divided form as to be removed only partially by the usual water-wash and other leaching operations. With a residual solids content in the order of 2% wherein most of the solids are usually of less than 325 mesh in size, these natural bitumens have proved to be difficult to reclaim for usual hydrocarbon purposes.

It is also recognized that various suggestions for thermal treatment have been made. These proposals bring in other complications, however, as the tar sands frequently have as high as 5% of sulfur and a soluble metal content as of vanadium or nickel or both, of the order of 200 parts per million. With a gravity of about 10° API, and a Ramsbottom carbon number of the order of at least 12 weight percent, thermal treatments of above 500 or 600° F. not only may produce as much as 20 weight percent of coke, which is of very low grade, but also produce a high yield of high sulfur distillate. Usually a heating below 500 to 600° F. fails to effect the non-settling character of the silt.

There appear to be many factors which have an effect on the separation of clay-like materials from hydrocarbons of the type of Athabasca tar sands. One of these factors is the size of the clay-like or sand particles. Another is the viscosity of the liquid from which the clay or sand is to be removed. Another factor is the apparent existence of a water film around each particle that is repellant to the hydrocarbons. The low concentration of solids also impedes its removal.

It is an object of this invention to provide an improved process for the treatment of tar sand hydrocarbons and similar natural bitumens containing normally nonsettleable fines so as to permit removal of the fines and recover a material comparable to a naturally sweet crude.

More specifically, the invention is directed to an improved thermal hydrogenation of tar sands to convert the fines to a settleable condition whereby a silt free product can be produced.

A further object of my invention is to provide a novel hydrogenation treatment of tar sands to produce an improved product, and to avoid any substantial loss of the charge.

Further objects and advantages of the invention will appear from the following description of a preferred form of embodiment thereof when taken in connection with the attached drawing illustrative thereof and in which the figure is a schematic flow diagram of a single stage treating process.

As more particularly shown in the drawing, a water washed and preheated natural tar including as much as 2% of silt, inorganic sand or the like, the particles of which are generally less than 325 mesh in size is introduced through line 10 to a reactor 12. A hydrogen rich gas (more than 60% hydrogen) may be introduced directly to the charge through line 14.

The reactor 12 is preferably a tall, relatively small diameter unit (with a $L/D$ ratio of at least 4 for example), and as hereinafter pointed out, a portion of the liquid from the upper part of the reaction zone is recycled as by the line 15 back to the bottom portion of the reaction zone. While, for purposes of simplicity this is shown to be through an external circuit, it is obvious that internal recycle may be accomplished by suitable pressure differentials, pumps or gas lifts, etc.

Conveniently all of the liquid with ash is taken overhead in line 16 and fed to the separator chamber 18. In this chamber 18 there will be a phase separation of gas which is removed overhead by line 20 and the liquid and ash which will be removed as bottoms. Some of the liquid from line 16 may bypass separator chamber 18 through valved line 21 and the liquid then passed through pressure reducing valve 22 to the settling chamber 24.

This chamber 24 is preferably operated at atmospheric pressure to permit further gas removal at 25, the ash being removed as bottoms at 26 and an ash free liquid removed at 27. Customarily, this settling chamber 24 is formed with baffles, not shown, which tend to force the oil and solids downward to the bottom for the substantial removal of all of the ash through line 26.

The vapors and gases that pass overhead at 20 from the high pressure chamber 18 may be cooled at 28 and passed to separator 29 from which the gases such as hydrogen, methane, etc. may be removed through overhead line 30. These may be recovered or used as fuel depending upon the economics involved.

The liquid fraction removed at 31 as bottoms from separator 29 will be passed to a distillate treating line 32 for further treating, removal of sulfur, etc. In a similar manner the vapors and gases in line 25 from the low pressure separator 24 may be cooled at 33 and similarly passed to line 32.

The ash free liquid 27 from low pressure settler 24 will be passed to fractionator 36 and the gases will be removed overhead in line 40 also to the distillate treating line 32. Fractionator 36 may be operated under vacuum to produce a specification heavy fuel oil removed at 38.

Under normal conditions, it is found that the pressure in reactor 12 should be in the range of about 400 to 2000 p.s.i.g. and with a hydrogen partial pressure of from 200 to 1000 p.s.i.g. Temperatures will range from at least 700° F. to not to exceed about 950° F. and recycle should be accomplished at such a rate as to maintain a temperature which does not vary more than about 10° F. from top to bottom. Hydrogen consumption is in the range of 500 to 1500 s.c.f./bbl.

It is not essential that the reactor 12 be filled with solids other than the accumulation of silt that exists in tar sands. It has been found that the recycle of effluent from top to bottom tends to concentrate the solids from ten to twenty times as much as in the feed before equilibrium is reached. In one case for example, where the feed contained about 1½% of silt, it was found that after some hours of recycle, the accumulated solids amounted to approximately forty percent. Thereafter, the effluent leaving the reactor at 16 was found to have substantially the same ratio of solids as the feed 10 although they differed in that the solids in the effluent would settle out in the chambers 18 and 24. Flow rates through these chambers 12, 18 and 24 are arranged to allow from one half hour to about one and one half hours total residence time with in excess of 99% separation of solids.

The concentration of solids results from the recycle oil through line 15 which carries with it a much greater concentration of ash than the feed. This is a result of particle size increase which tends to make these particles settle as they are carried upward in the oil. Actual complete settling is impossible since the velocity of the oil and hydrogen keep the particles in motion. This concentration of ash in the reactor will eventually reach an equilibrium value. From that time on, the inlet and outlet ash concentrations will be equal. The type of ash, however, will be different since the inlet material will not settle while the outlet ash will.

The hydrogenation of tar sands is not entirely understood but it appears that the tar can be heated to a much higher temperature in the presence of hydrogen without excessive carbon formation than a similar material can be heated without hydrogen. Undoubtedly, the temperature and pressure and time in the hydrogen atmosphere cause the modification of the characteristics of the sands so that they do settle out.

While only a small consumption of hydrogen was contemplated, it was found that the hydrogen consumption was unexpectedly high. This is apparently due to the presence, in tar sands, of an iron component that not only acts catalytically but reacts with the sulfur present. Apparently, the tendency of the fines to act as a catalyst makes any other catalyst, or contact material in the reactor 12, unnecessary.

Usually, however, the distillate in line 32 and the heavy fuel oil in line 38 do contain organo-metallic compounds including sulfur which can best be removed in accordance with the teaching of the Keith-Layng application, Serial No. 737,711, filed May 26, 1958, now Patent No. 2,987,467.

I claim:

1. A process for refining a natural tar derived from tar sand containing in the order of 1% or more of silt having a particle size of the order of smaller than 325 mesh and normally being nonsettling from said tar sand at temperatures up to coking temperature, which refining process includes the steps of passing the tar sand substantially in the liquid phase through a reaction zone in the presence of a hydrogen containing gas under temperature in the range of 700 to 950° F. and hydrogen partial pressure in the range of 200 to 1000 p.s.i.g. and space velocity to provide a residence time in the order of one-half hour to about one and one-half hours whereby said silt becomes free settling and settling the effluent to remove a substantially silt free liquid and an ash containing residue.

2. A refining process as claimed in claim 1 wherein the liquid tar sand is passed upwardly through the reaction zone and a part of the effluent from the reaction zone is recycled to the lower part of the reaction zone to establish a concentration of ash in the order of from about 25% to 50% by weight.

3. A process for hydrogenating a natural tar sand having from 0.1% to 5% of silt which comprises flowing said tar sand at temperatures of at least 600° F. and a hydrogen rich gas upwardly through a reaction zone under a hydrogen partial pressure of at least 200 p.s.i. to minimize coke formation and to hydrogenate the hydrocarbon contaminants in said tar sand and to render the silt settleable, maintaining a solids settling zone for the effluent of said reaction zone to permit settling of part of the silt, recycling a portion of the tar sand effluent from said solids settling zone to the lower portion of said reaction zone whereby the silt concentration in said reaction zone is increased to at least 20 weight percent, removing an equilibrium silt containing tar sand effluent, and settling out the silt therefrom.

4. A process for hydrogenating a natural tar sand as claimed in claim 3 in which the recycle ratio is at least 10 to 1 based on feed.

5. A process for hydrogenating a natural tar sand as claimed in claim 3 in which the silt contains an iron compound and the hydrogen consumption rate is in excess of 500 s.c.f./bbl.

6. A process as claimed in claim 3 wherein the liquid components are vacuum distilled to produce an ash free heavy fuel oil.

References Cited in the file of this patent
UNITED STATES PATENTS

| 2,057,402 | Tropsch | Oct. 13, 1936 |
| 2,965,557 | Price | Dec. 20, 1960 |
| 2,987,465 | Johanson | June 6, 1961 |